US 6,560,937 B1

(12) United States Patent
Gardner et al.

(10) Patent No.: US 6,560,937 B1
(45) Date of Patent: May 13, 2003

(54) EXTENDABLE BAY WINDOW FOR MOBILE LIVING QUARTERS

(75) Inventors: Stewart E. Gardner, Bristol, IN (US); Dennis B. Vance, Edwardsburg, MI (US)

(73) Assignee: Bay View, LLC, Elkhart, IN (US)

( * ) Notice: Subject to any disclaimer, the term of this patent is extended or adjusted under 35 U.S.C. 154(b) by 0 days.

(21) Appl. No.: 09/702,451

(22) Filed: Oct. 31, 2000

Related U.S. Application Data

(60) Provisional application No. 60/163,180, filed on Nov. 3, 1999.

(51) Int. Cl.[7] .............................. E06B 1/38; E06B 3/32
(52) U.S. Cl. ............................................. 52/201; 52/71
(58) Field of Search ............................. 52/201, 204.51, 52/143, 64, 67, 69, 71, 72, 73; 49/71

(56) References Cited

U.S. PATENT DOCUMENTS

| | | | | | |
|---|---|---|---|---|---|
| 436,066 | A | * | 9/1890 | Frederickson | 52/201 |
| 1,256,452 | A | * | 2/1918 | Evans | 52/201 X |
| 1,345,147 | A | * | 6/1920 | Donovan | 160/183 X |
| 1,380,237 | A | * | 5/1921 | Neff | 160/183 |
| 1,515,241 | A | * | 11/1924 | David | 52/201 X |
| 1,905,369 | A | * | 4/1933 | Craven | 52/201 |
| 1,975,933 | A | * | 10/1934 | Franklin | 52/201 X |
| 2,137,290 | A | * | 11/1938 | Huckstep et al. | 52/71 |
| 2,311,550 | A | * | 2/1943 | Kauffman | 160/183 X |
| 2,333,574 | A | * | 11/1943 | Kauffman | 160/183 |
| 2,568,009 | A | * | 9/1951 | Johnson | 52/201 X |
| 2,690,797 | A | * | 10/1954 | Eriksen | 52/201 X |
| 2,926,042 | A | * | 2/1960 | Calthorpe | 52/72 X |
| 3,074,125 | A | * | 1/1963 | Miller | 52/201 X |
| 6,250,701 | B1 | * | 6/2001 | Vance | 296/26.01 |

* cited by examiner

Primary Examiner—Laura A. Callo
(74) Attorney, Agent, or Firm—Baker & Daniels

(57) ABSTRACT

The present invention involves a foldable bay window for mobile living quarters, such as recreational vehicles, is movable between an extended position, in which the bay window projects from a wall of the unit to a folded position, in which the components of the bay window assembly are substantially flat against the outer wall of the unit. The bay window assembly includes a pair of side panes which are slidably and pivotally mounted on horizontally extending tracks on the wall of the unit, and a center pane connecting the side panes. A bottom panel is pivotally connected to the wall or center pane and is constrained for movement along vertical tracks, to thereby force the panes into the folded position as the bottom panel is moved from a substantially horizontal position to a substantially vertical position. As the panes are folded against the wall of the vehicle, a hinged roof panel drops into a substantially vertical position. The bay window assembly may also be located on the ceiling of the mobile living quarters, with a roof pane being capable of pivoting to an extended position to support the side panes.

25 Claims, 14 Drawing Sheets

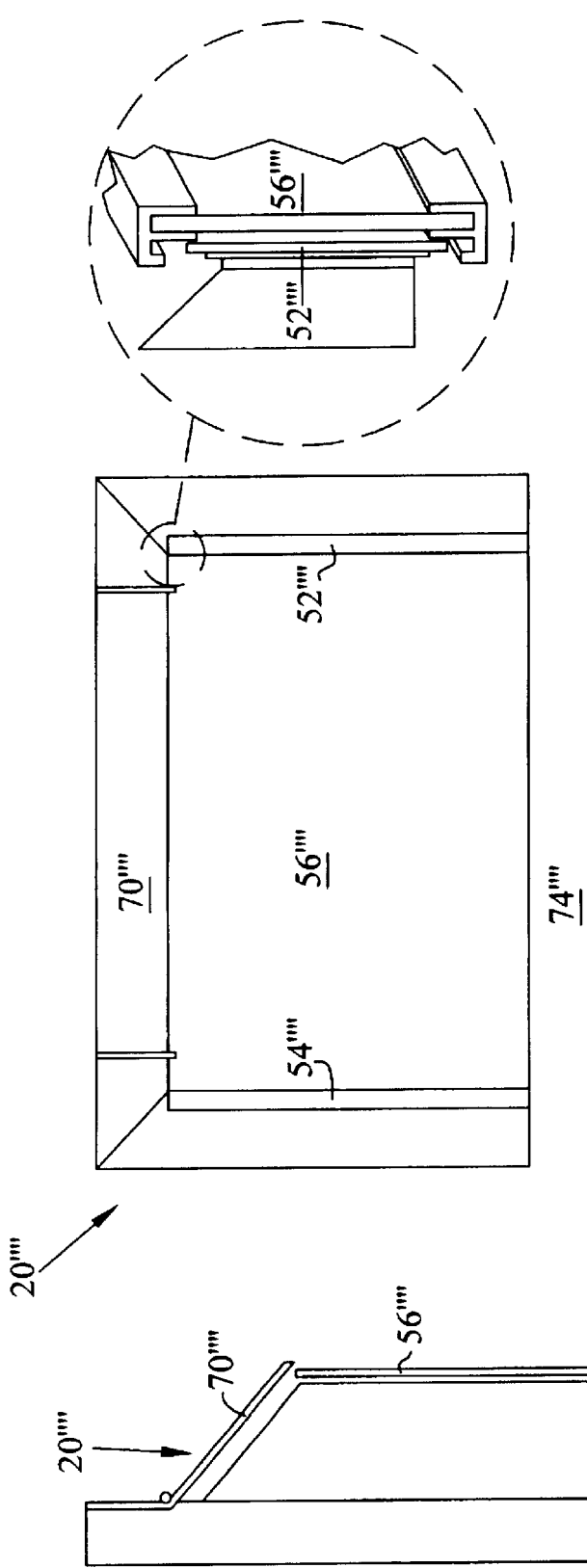
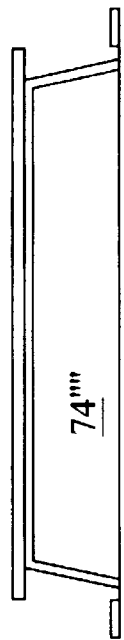
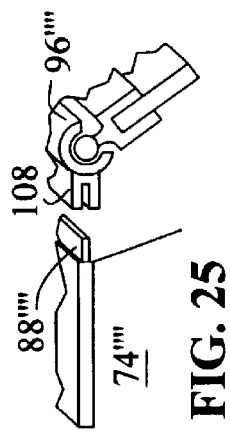
FIG. 22
FIG. 24
FIG. 21
FIG. 25
FIG. 23

EXTENDABLE BAY WINDOW FOR MOBILE LIVING QUARTERS

This application claims the benefit of Provisional application No. 60/163,180, filed Nov. 3, 1999.

BACKGROUND OF THE INVENTION

1. Field of the Invention

This invention relates to a bay window for use with mobile living quarters, such as recreational vehicles, manufactured housing, and specialty trailer structures.

2. Description of the Related Art

Physical dimensional restrictions limit the amount of interior space within many structures providing living space. For example, recreational vehicles, manufactured housing, and specialty trailer structures are restricted in their width dimension because of space restrictions on the highways upon which these structures are transported. However, once the recreational vehicle, manufactured housing, or specialty trailer component has completed its transport, either temporarily or permanently, the structure no longer has a width restriction. In fact, the occupants of those structures would prefer to have a greater amount of interior living space.

To accommodate the desire for additional interior space, several different configurations have been employed. One example involves creating a pop-out compartment formed by the extension of side walls from the recreational vehicle. In the side walls' retracted position, the side walls form interior partitions within the vehicle. These interior partitions limit the amount of interior space within the vehicle when the compartment is retracted.

Another example involves a tent camper with a lateral slide-out room. The tent camper includes a camper main body that is pulled in a longitudinal direction by a towing vehicle. A roof, aligned above the camper main body, is movable between a lowered, storage or transport position and a raised, camping or deployed position. The lateral slide-out room, coupled to the camper body, is movable in a lateral direction between a retracted, storage position and an extended, operational position. This allows the lateral slide-out to extend and provide additional living space within the camper. The interior space of the camper is not habitable in the retracted, transport position; therefore, the overlap or interior partition of the slide-out side walls within the camper is not an issue.

A further example involves a mobile accommodation structure such as a caravan or motor home with a foldable extension for enlarging the volume of the vehicle. A wall panel is attached to guide rails on the side of the vehicle for pivotal and sliding movement over the vehicle side wall. Another wall panel is only pivotally connected to the side wall, while the middle wall panel is pivotally connected to both other wall panels. The roof of the accommodation structure is hinged on the vehicle roof edge, enabling it to move from a position overlying the vehicle roof to a position covering the trapezoidal recess formed by the side walls when deployed. The floor is hinged on the floor edge so that it is capable of moving from a position parallel to the vehicle side wall to a position co-planar with the vehicle floor.

Each of these prior structures includes drawbacks in terms of the use and reliability of the extension unit. In most recreational vehicles, the creation of interior partitions in the retracted position diminishes the utility of the extension, as often such interior partitions interfere with the amount of the space within the vehicle during transport, either as living or storage space. The deployment mechanisms, such as the pivotal and sliding connection on the body of a recreational vehicle, require manufacturing complication and expense to create the extension unit. Also, the movable connections of the wall panels with the vehicle require seals to prevent the penetration of moisture and the elements into the interior region. Finally, the difficulty of deploying the additional interior space often involves complex mechanisms requiring application of significant force on the mechanism. However, for convenience of use, units which may be deployed using only the equipment associated with the structure are preferred.

For both aesthetic and practical reasons, it is desirable that movable living quarters, such as recreational vehicles, manufactured housing, and specialty trailer structures, include distinctive architectural features such as bay windows, which also increase natural lighting within the unit. However, it is also necessary that the overall width of such movable living quarters with such distinctive architectural features be limited to that which can be accommodated for movement along a public highway. Furthermore, it is desirable that the interior living space be maximized for the otherwise space-limited movable living quarters. For all these reasons, any such distinctive architectural features cannot extend beyond the sidewalls of the vehicle when the vehicle is moved, but are greatly desired when the living quarters unit is deployed.

What is needed in the art is an extension unit which provides the desired additional interior space and distinctive architectural features without creating interior partitions, which minimizes leakage points into the interior space, and which accomplishes these goals with a minimal increase in complication and expense.

SUMMARY OF THE INVENTION

The present invention relates to a track capable of being aligned with the opening of a wall of a living quarters structure to provide a bay window extension unit. A window frame with a window is movable between a folded position, adjacent to the opening of the wall, and an extended position, spaced from and parallel to the wall. A bay window panel is connected to the window frame and is also movable between a folded position, adjacent to the opening of the wall, and an extended position, transverse to the wall and extending from the opening of the wall to the window frame. The track is operably engaged with one end of the bay window panel to provide the range of movement between the folded and extended position.

The present invention relates to a foldable bay window which may be mounted in the side of such mobile living quarters. When the unit is parked for use, the bay window is extended from the vehicle to provide both architectural distinctiveness and to permit increased natural lighting in the interior of the vehicle. The bay window also provides a shelf upon which plants, etc. may be placed to be exposed in the sunlight provided by the bay window. When the unit is to be moved, the bay window can be folded substantially flat against the side of the unit, so that the overall width of the unit is not appreciably changed, thereby permitting travel on public roads and also protecting the bay window from damage.

A plurality of panes are mounted for movement relative to the sidewall of the mobile living quarters and to each other. A roof panel is movably mounted on the sidewall for closing an opening defined between the panes and the wall when the bay window is in the extended position. The panes and roof panel are movable outwardly from the wall when the bay window is moved into the extended position, and can be folded against the wall when the bay window is moved into the folded position. The panes may be connected by a pane connecting hinge. The roof panel includes an attachment edge and a roof attachment hinge pivotally attaching the roof panel to the wall for movement. The roof panel moves between a substantially vertical position when the bay window is in the folded position to an outwardly extending position extending outwardly from the sidewall when the bay window is in the extended position. The roof panel is supported in the outwardly extending position by the panes. The panes are slidably mounted in a track mounted on the sidewall.

The panes include a pair of side panes and a center pane extending between the side panes, and a pair of pane connecting hinges, with each pane connecting hinge connected the center pane to a corresponding one of the side panes. Each of the side panes includes a mechanism for mounting the side panes for sliding and pivoting movement relative to the wall, the mechanism including a pin extending from an edge of each side pane, each pin slidably engaging a horizontally extending track on the sidewall. The roof panel includes an attachment edge and a roof attachment hinge pivotally attaching the roof panel to the sidewall for movement between a substantially vertical position when the bay window is in the folded position to an outwardly extending position extending outwardly from the wall when the bay window is in the extended position, with the roof panel being supported in the outwardly extending position by the panes. The bottom panel extends between the panes and pivots with respect to the wall between a substantially horizontal position when the bay window is in the extended position and a substantially vertical position when the bay window is in the folded position. The bottom panel is pivotally connected to the center pane for movement about a generally horizontal axis, and is slidably mounted on the sidewall for sliding movement in a generally vertical direction. The bottom panel extends between the panes and pivots with respect to the sidewall between a substantially horizontal position when the bay window is in the extended position and a substantially vertical position when the bay window in the folded position.

The present invention, in one form, involves mobile living quarters having a wall and a window opening in the wall with an upper edge, a lower edge, and a pair of side edges extending between the upper and lower edges. A bay window closes the opening and is movable from an extended position extending across said opening and projecting away from the wall when the mobile living quarters are parked for use to a folded position extending across the opening and folded against the opening and a portion of the wall surrounding the opening. The bay window comprises a pair of tracks, a pair of side panes, and a horizontal hinge. The pair of tracks is substantially horizontal and extends outwardly from the side edges of the opening. Each of the pair of side panes is slidably mounted in the tracks, and also pivot relative to the tracks. The roof panel is mounted by a generally horizontal hinge on the sidewall above the upper edge, the roof panel swinging about the hinge from an outwardly projecting position supported by the panes when the bay window is in the extended position and hanging along said sidewall from the hinge when the bay window is in the folded position.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 21 is a fragmentary view in perspective and taken from inside a recreational vehicle equipped with a fifth embodiment of a foldable bay window pursuant to the teachings of the present invention, the bay window being illustrated in a position intermediate to the fully extended and extended positions.

FIG. 22 is a partial cutaway illustrating the connection between the center pane and a side pane of the fifth embodiment of the present invention.

FIG. 23 is a side view taken from outside a recreational vehicle equipped with a fifth embodiment of a foldable bay window pursuant to the teachings of the present invention, the bay window being illustrated in a position intermediate to the fully extended and folded positions.

FIG. 24 is a plan view of the bottom panel of the fifth embodiment.

FIG. 25 is an exploded side view of a pivot pin and hinge seal of the fifth embodiment of the present invention.

Figure 1:
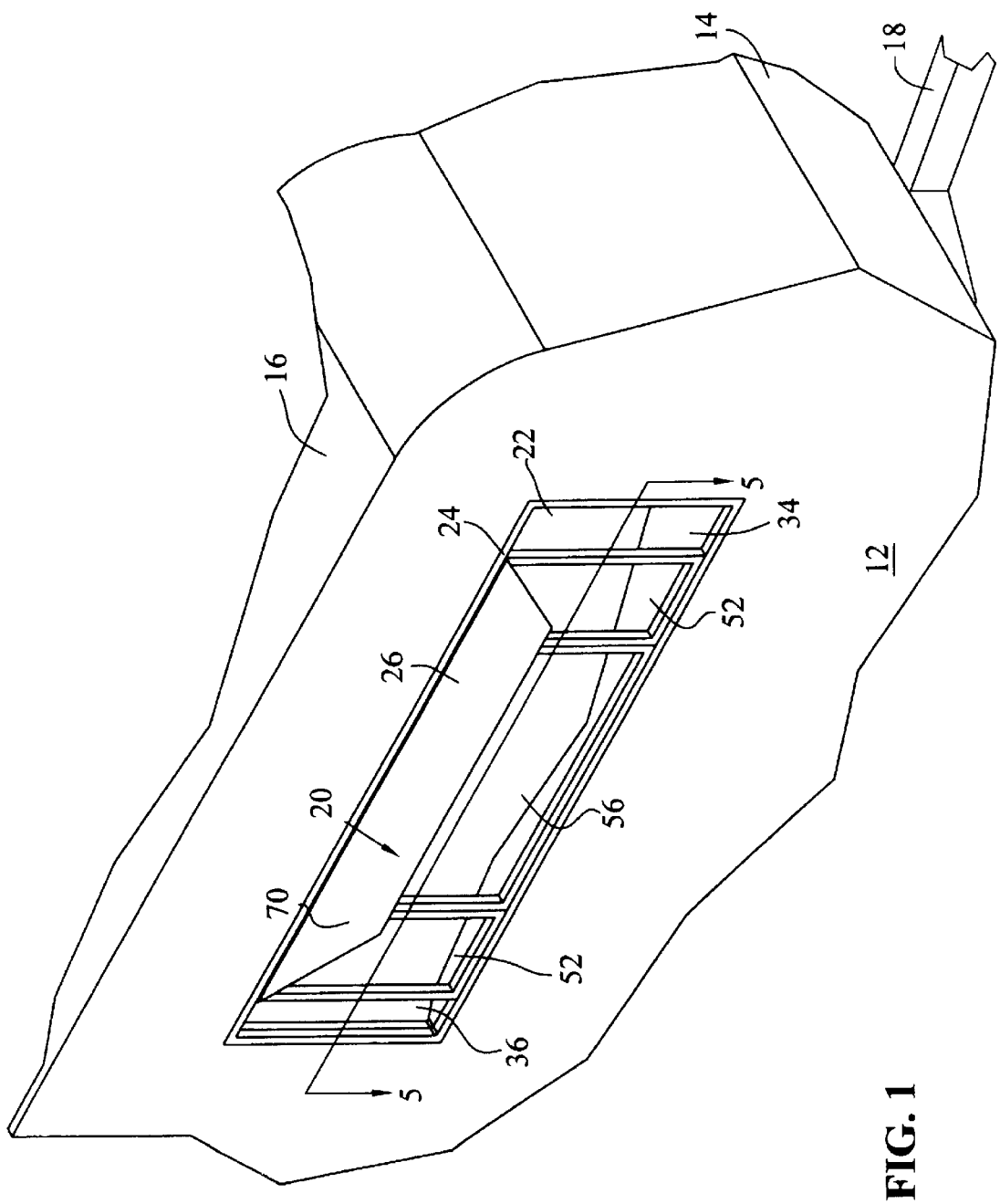
FIG. 1 is a fragmentary view in perspective of a recreational vehicle equipped with a first embodiment of a foldable bay window pursuant to the teachings of the present invention, the bay window being illustrated folded against a side wall of the vehicle.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

The embodiments disclosed below are not intended to be exhaustive or limit the invention to the precise form disclosed in the following detailed description. Rather, the embodiments are chosen and described so that others skilled in the art may utilize their teachings.

Figure 2:
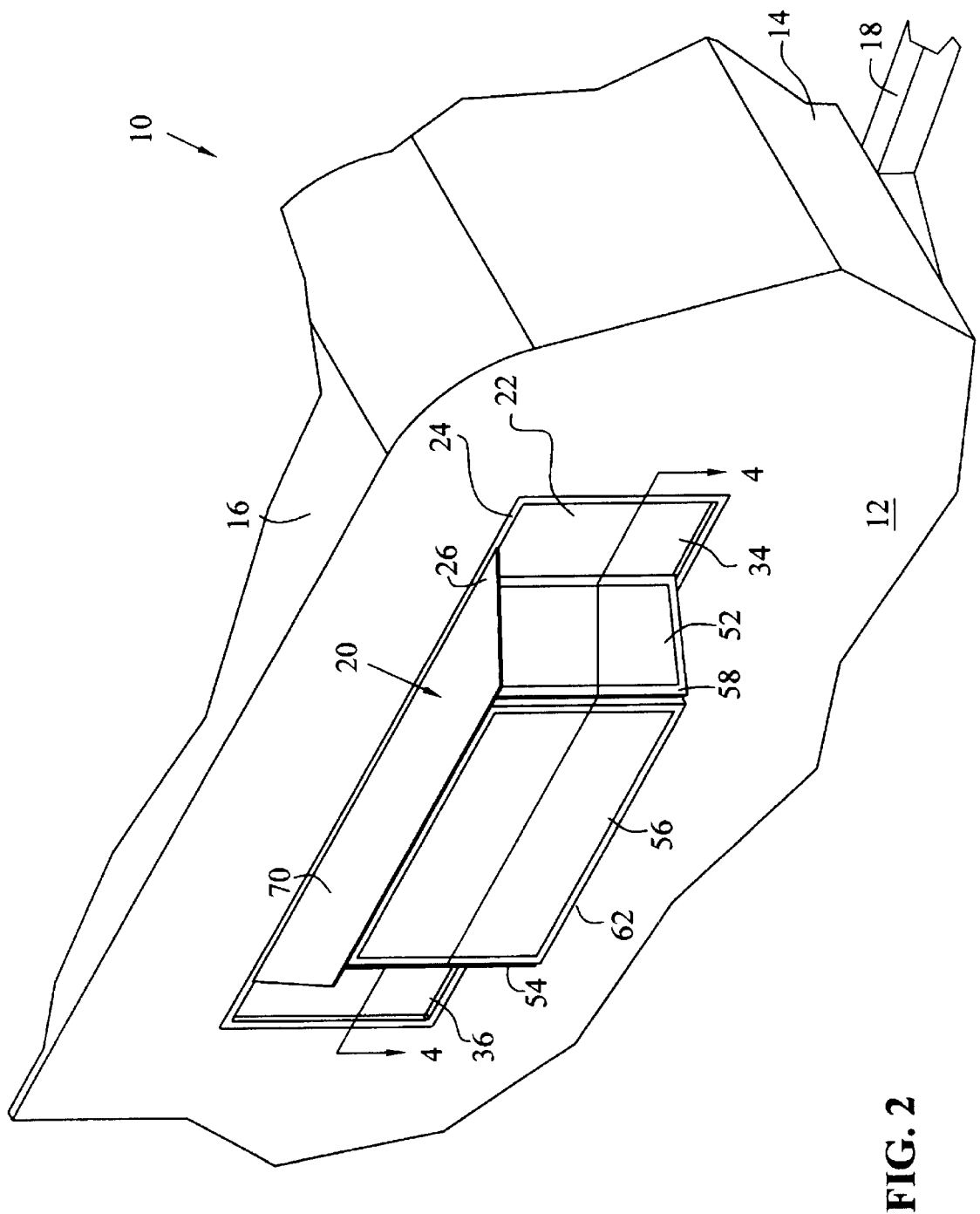
FIG. 2 is a view similar to FIG. 1, but illustrating the bay window of the present invention in the extended or deployed position.
Figure 3:
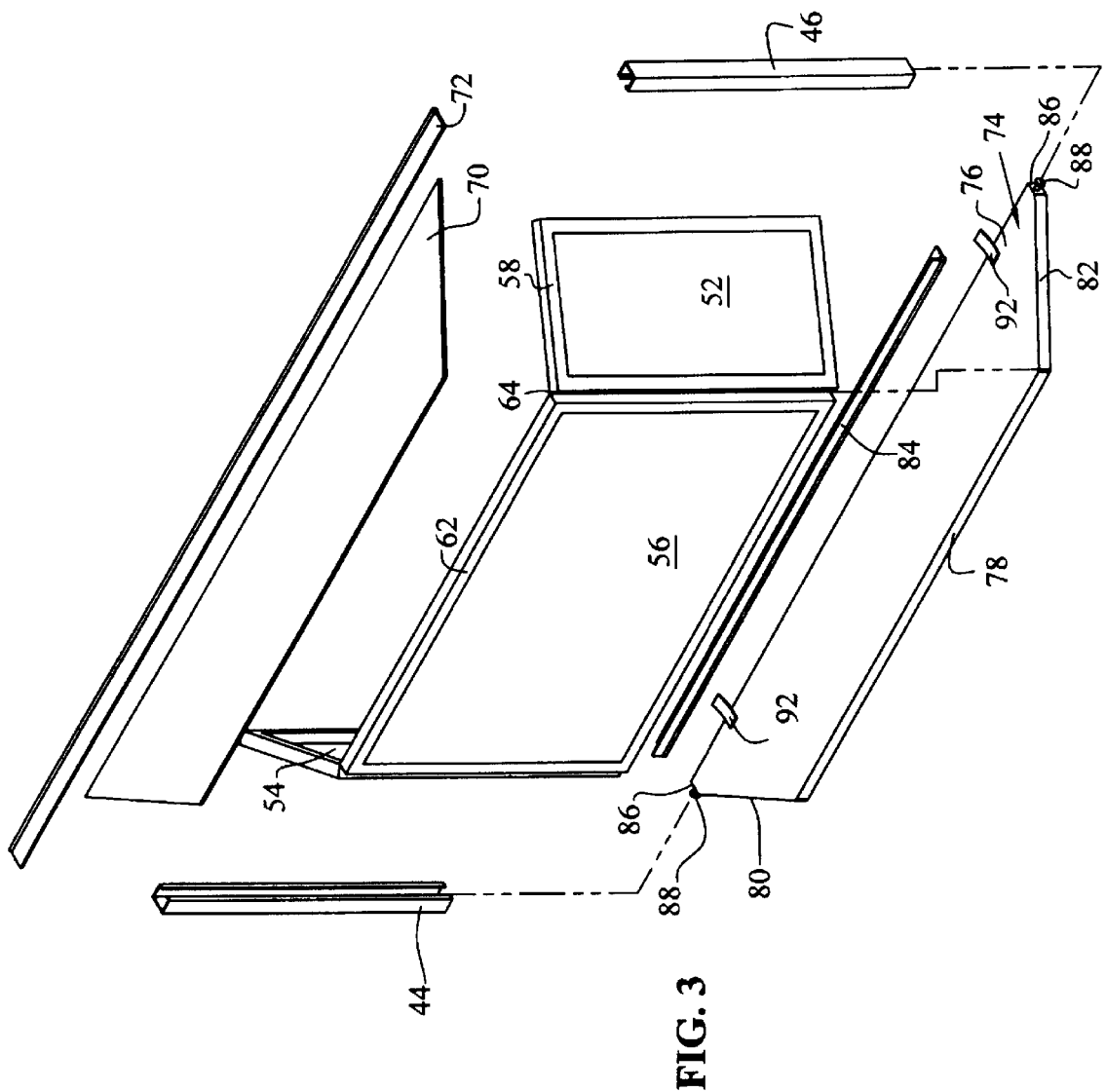
FIG. 3 is an exploded view in perspective of a bay window made pursuant to the teachings of the present invention.

FIGS. 1 and 2 show a portion of recreational vehicle or living quarters structure unit 10 including side wall 12, front wall 14 and ceiling 16, all of which are supported on frame 18 which is typically mounted on a flatbed trailer having wheels (not shown) to enable transport of living quarters structure 10 on public highways. Living quarters structure 10 may be exemplified by recreational vehicles, manufactured housing, and specialty trailer structures. Conventionally, frame 18 is supported on a flatbed trailer equipped with a hitch for connection to a towing vehicle.

According to a first embodiment of the invention, bay window assembly 20 is mounted in opening 22 in sidewall 12. As shown in FIGS. 4–7, assembly 20 includes outer frame 24 comprising outer trim piece 26 which extends outwardly from opening 22 along the outer surface of wall 12 and upper frame member 28 which extends along the upper edge of opening 22, and lower frame member 30, which extends along the lower edge of opening 22. Weatherstripping 32 is mounted along the portion of trim piece 26 extending along lower frame member 30 for sealing between trim piece 26 and bottom panel 74 (See FIGS. 6–8). Frame member 24 also includes side panels 34, 36 which project inwardly into opening 22 from side edges 38 of opening 22. Panels 34, 36 include horizontally extending tracks 40, 42 which extend along the lower edges of the panels adjacent the lower portion of trim piece 26. Panels 34, 36 terminate in vertically extending tracks 44, 46 which cooperate with upper frame members 28 and lower frame member 30 to define the window opening. Interior trim piece 48 is secured on the interior of sidewall 12 by fasteners 50 and circumscribes opening 22.

Bay window assembly 20 further includes a pair of side panes 52, 54 which include a portion having translucent material, and a center pane 56, which also includes a portion having translucent material. The translucent material may be selected from various materials for covering window openings, such as glass, plexiglass, plastic, and the like. Side pane 52 includes frame 58 which circumscribes the translucent portion of pane 52; similarly pane 54 includes frame 60 and center pane 56 includes frame 62. Frame 58 of pane 52 is movably connected to one edge of frame 62 of center pane 56, in the exemplary embodiment with vertically extending hinge 64. Similarly frame 60 of pane 54 is movably connected to the opposite side of frame 62 from that which frame 58 is connected to, in the exemplary embodiment by vertically extending hinge 66. Other connection mechanisms, such as adhesive materials, flexible connectors, and hook and loop connections may be substituted for hinges.

Pins 68 project downwardly from lower corners of frames 58, 60 opposite the corner on which hinges 64, 66 are mounted. Pins 68 slidably and pivotally engage tracks 40, 42 to permit panes 52 and 54 to slide horizontally while pivoting about hinges 64, 66, to thereby permit window 20 to be folded from the fully extended position illustrated in FIG. 2 when the unit is parked for use to the folded position illustrated in FIG. 1, in which bay window 20 is folded against the outer surface of wall 12. As described in greater detail below, roof panel 70 and bottom panel 74 also move in conjunction with panes 52, 54, and 56 and frames 58, 60, and 62.

Roof panel 70 is movable connected to wall 12, in the exemplary embodiment via hinge connection 72 to permit pivoting of roof panel 70 from the extended position, in which roof panel 70 projects outwardly from wall 12, to a folded position, in which roof panel 70 hangs vertically. In the extended position, roof panel 70 is supported on the upper edges of frames 58, 60 and 62, with frames 58, 60 tapering upwardly from their hinges 64, 66 that connect them with frame 62 of center frame 56 toward wall 12. Accordingly, when window 20 is folded roof panel 70 pivots from the outwardly projecting position to a substantially vertical hanging position.

Window assembly 20 further includes bottom panel 74, which in the exemplary embodiment has a generally trapezoidal shape. Bottom panel 74 has inner edge 76, outer edge 78, and tapering side edges 80, 82, with outer edge 78 being shorter than inner edge 76. Edge 78 is movably connected to the lower edge frame 62, in the exemplary embodiment by hinge 84, thereby permitting bottom panel 74 to pivot about center pane 56 about a generally horizontal axis. Edges 80 and 82 terminate in non-tapering portions 86 from which pivot pins 88 project. Pivot pins 88 are slidably and pivotally received in corresponding ones of tracks 44, 46. Pins 88 are offset from edge 76 a distance such that when bottom panel 74 is disposed in the extended position in which bottom panel 74 is substantially horizontal, edge 76 is substantially flush with the inner surface of sidewall 12.

Lower frame member 30 and bottom panel 74 are provided with mating indented portions 90 to locate bottom panel 74 in a normal horizontal extended position. In the normal horizontal extended position, weatherstripping 32 engages bottom panel 74. A pair of strap fasteners 92 are secured to bottom panel 74 adjacent edge 76 and are long enough to extend over edge 76 and around the end of panel 74 to engage snap fasteners 94 mounted on inner trim piece 48.

Figure 4:
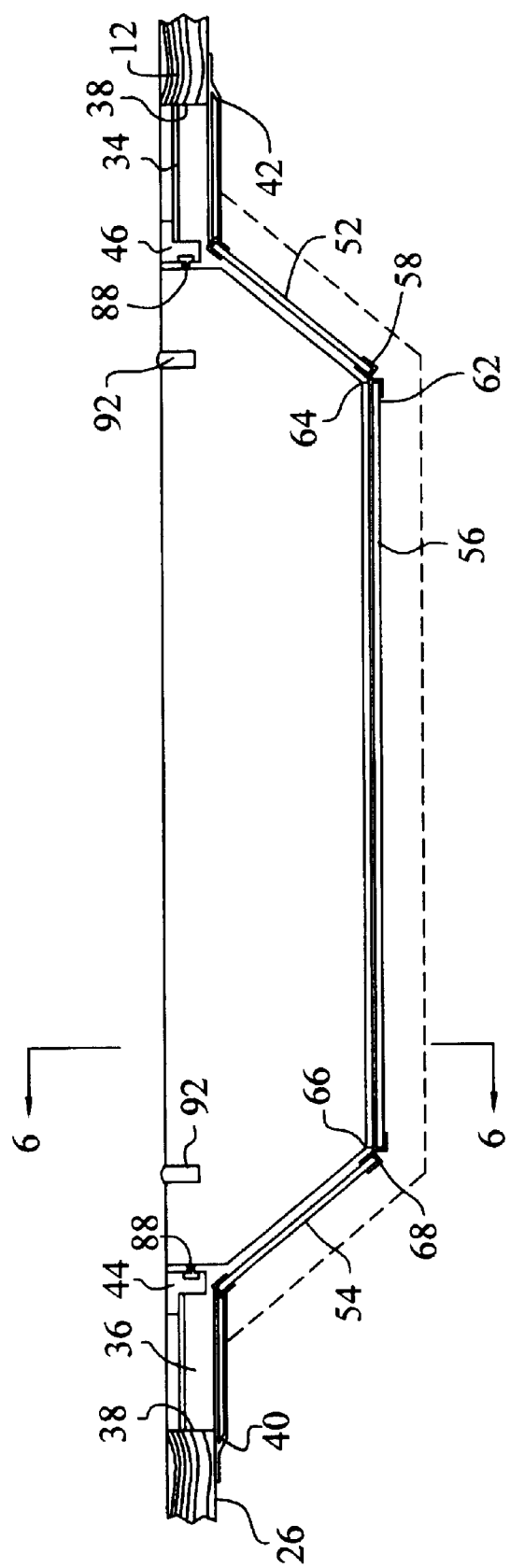
FIG. 4 is a view taken substantially along lines 4—4 of FIG. 2.
Figure 6:
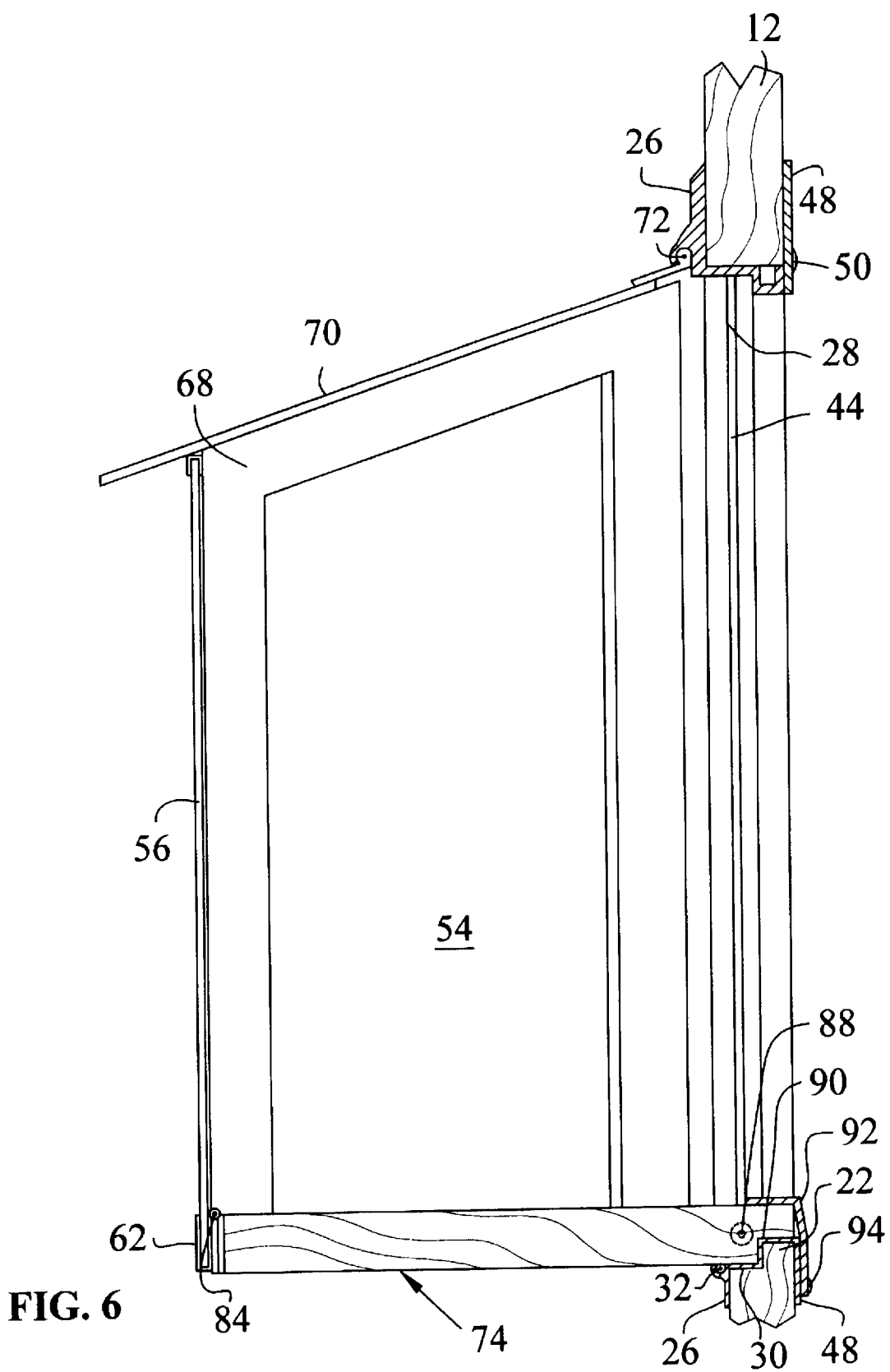
FIG. 6 is a view taken substantially along lines 6—6 of FIG. 4.

When the bay window assembly 20 is in the fully extended position illustrated in FIGS. 4 and 6 with straps 92 snapped into fasteners 94, bay window assembly 20 is rigid, since bottom panel 74 is restrained to allow only upward movement along tracks 44 and 46 and the resulting pivoting movement about hinge 84, and restraining straps 92 prevent this upward movement. Side panes 52, 54 are restrained for only horizontal movement in tracks 40 and 42. Accordingly, until release of straps 92, the bay window assembly is locked in the extended position. Bay window assembly 20 is locked in the extended position when the mobile living quarters or recreational vehicle 10 is parked for use.

Figure 5:
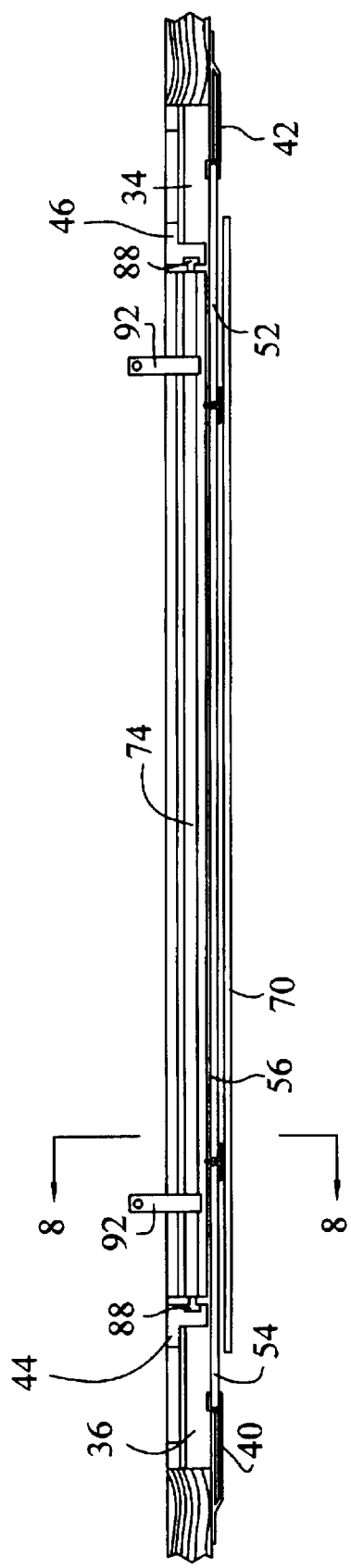
FIG. 5 is a view taken substantially along lines 5—5 of FIG. 1.
Figure 7:
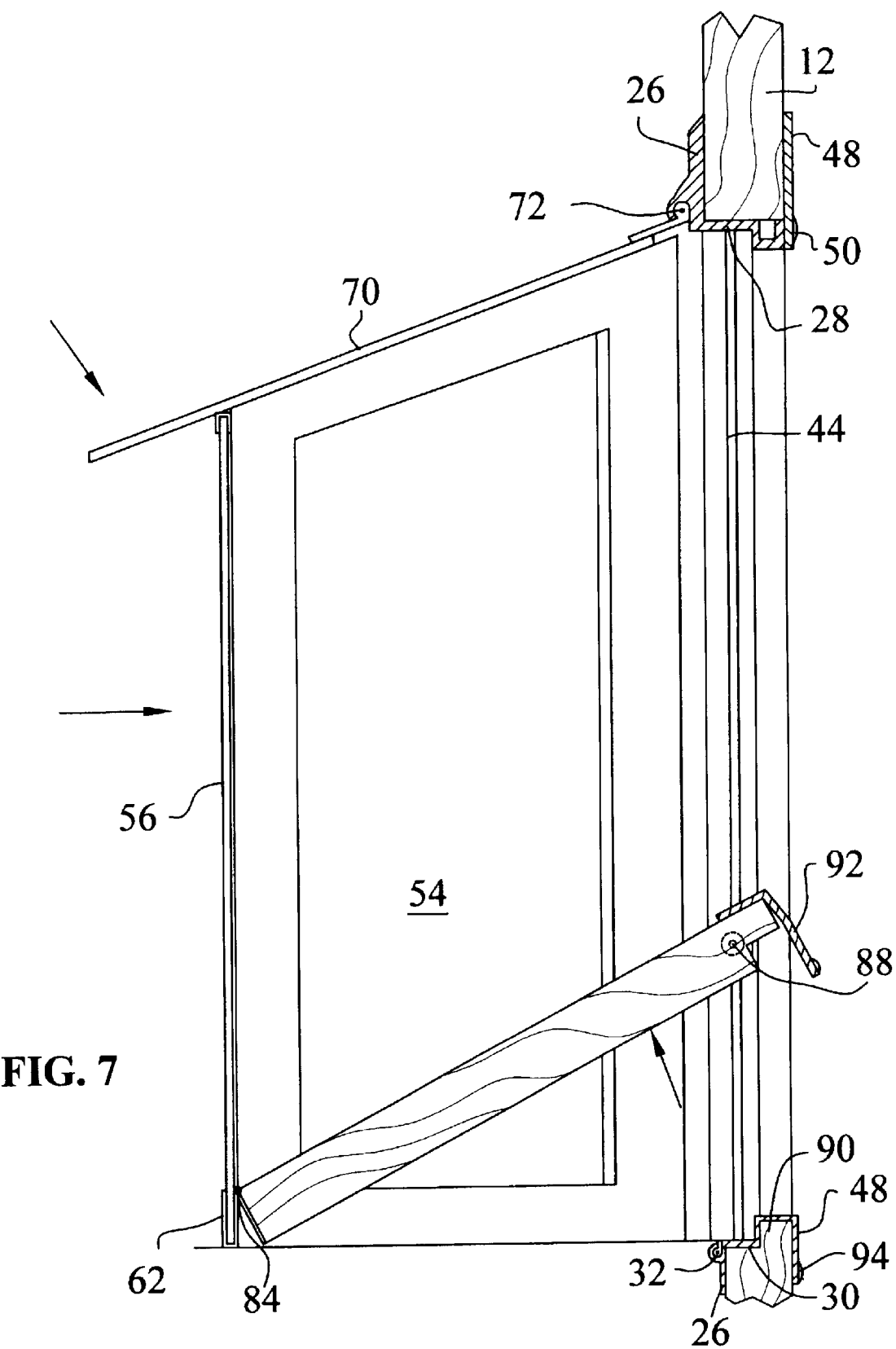
FIG. 7 is a view similar to FIG. 6, but illustrating the bay window in a position intermediate the fully extended and folded positions.
Figure 8:
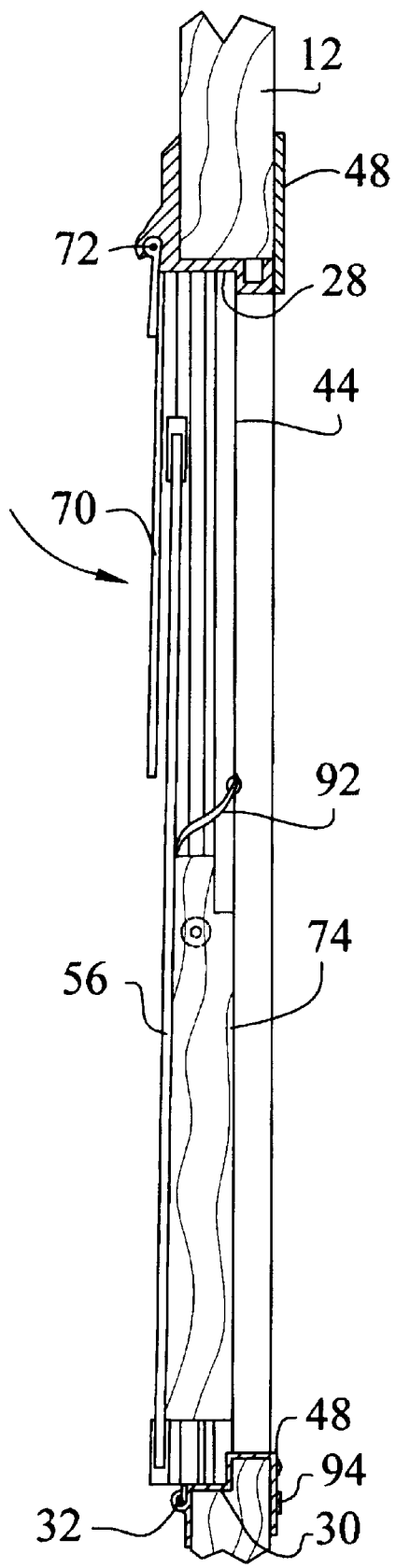
FIG. 8 is a view taken substantially along lines 8—8 of FIG. 5.
Figure 9:
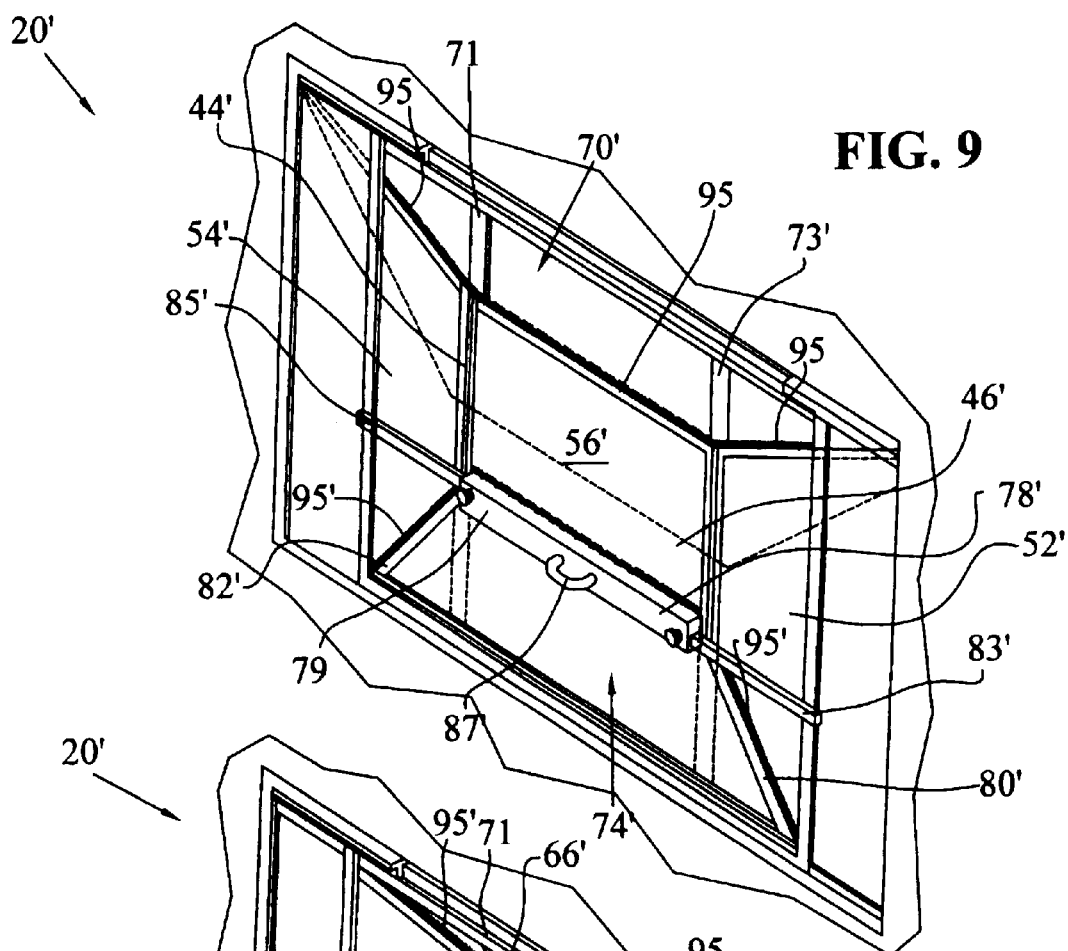
FIG. 9 is a fragmentary view in perspective and taken from inside a recreational vehicle equipped with a second embodiment of a foldable bay window pursuant to the teachings of the present invention, the bay window being illustrated folded against a side wall of the vehicle.
Figure 10:
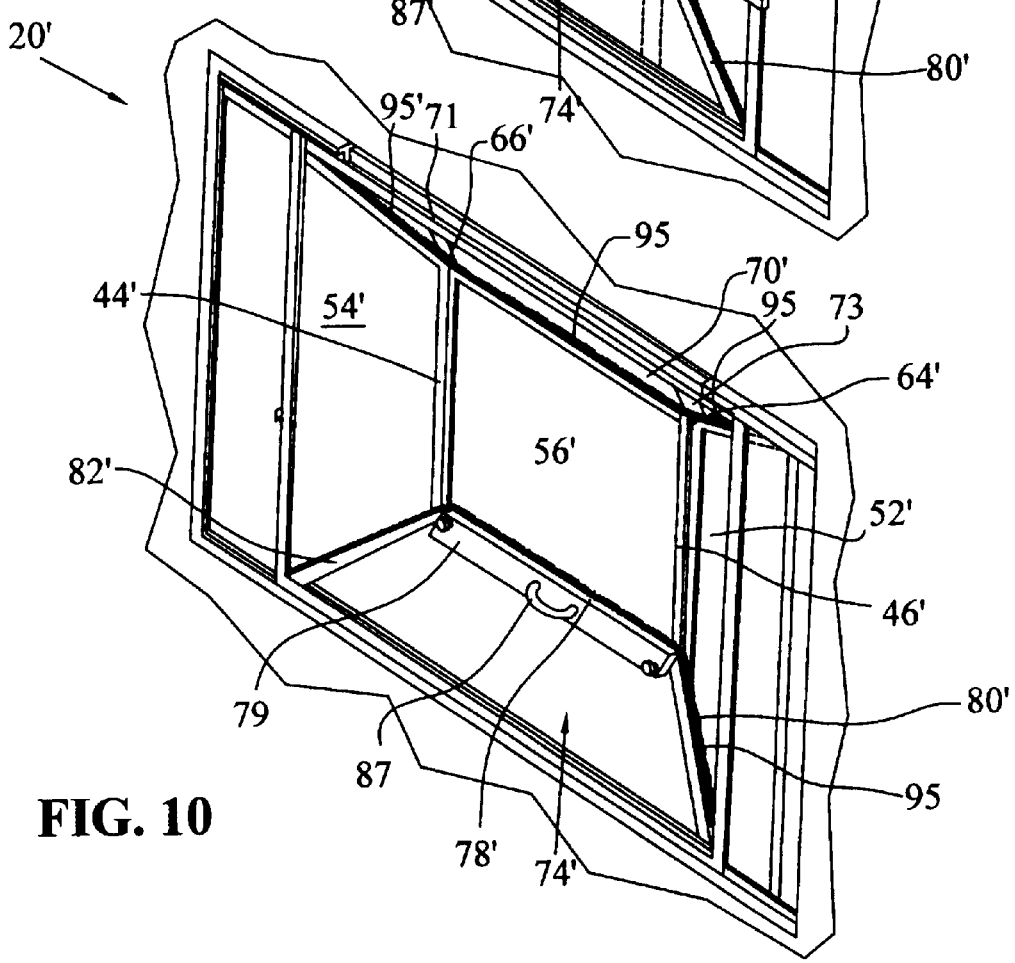
FIG. 10 is a view similar to FIG. 9, but illustrating the second embodiment of the bay window of the present invention in a position intermediate to the fully extended and folded positions.
Figure 11:
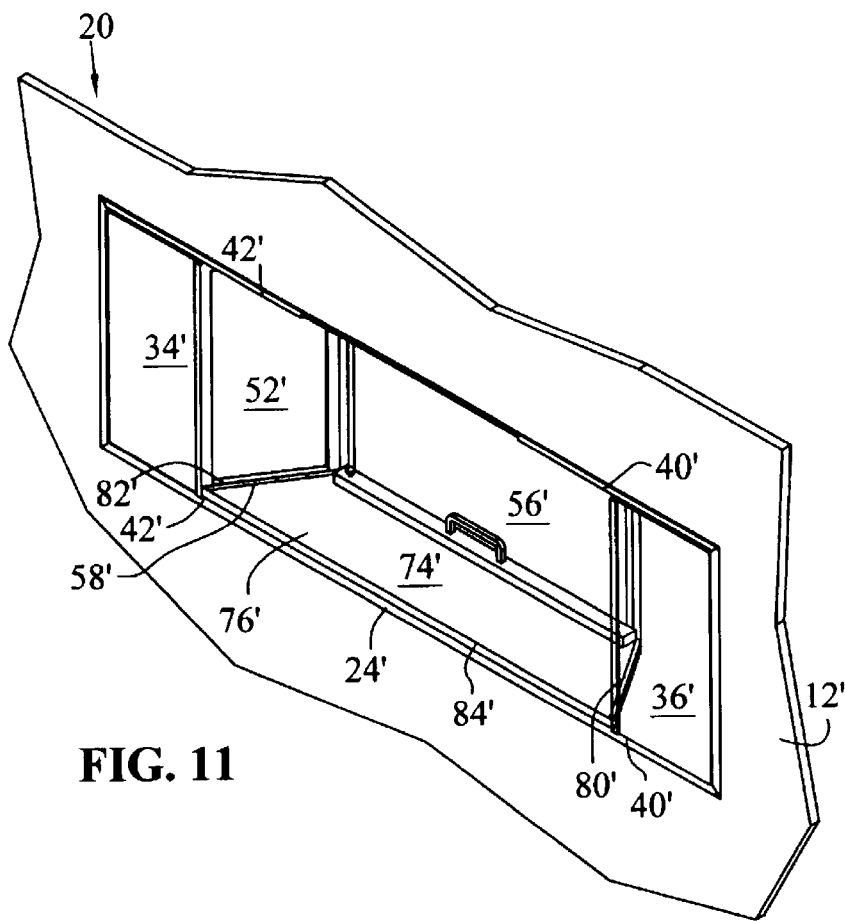
FIG. 11 is a view similar to FIG. 10, but illustrating the second embodiment of the bay window of the present invention in the extended or deployed position.
Figure 12:
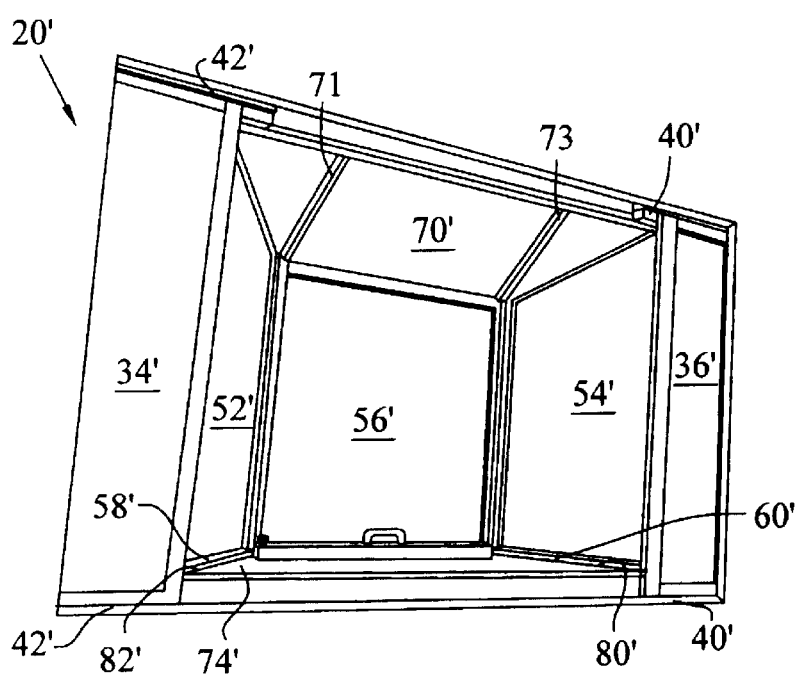
FIG. 12 is a fragmentary perspective view of the second embodiment of the bay window looking up through the roof panel of the present invention.
Figure 13:
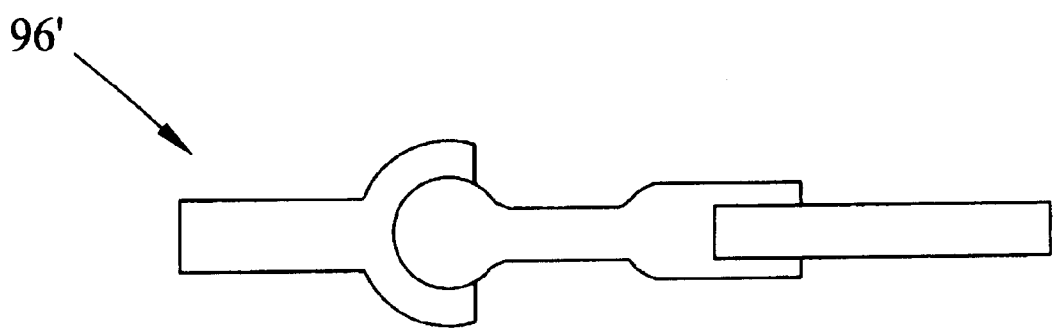
FIG. 13 is a side view of the hinge seal of the present invention.
Figure 14:
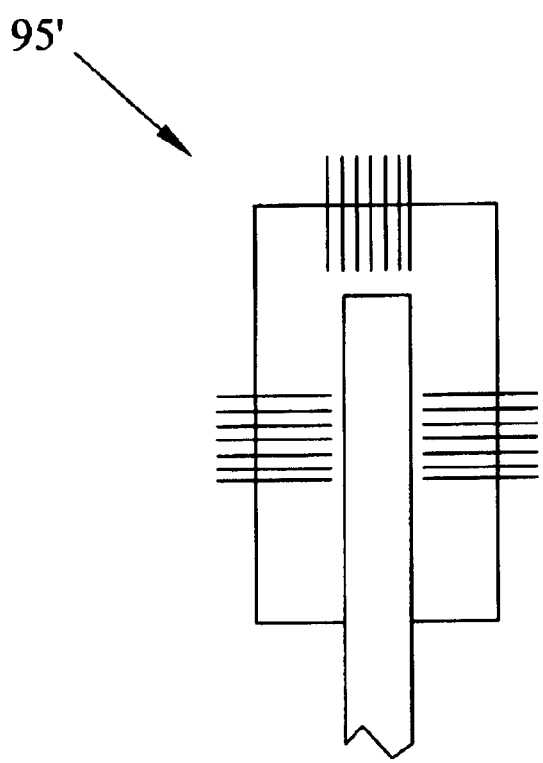
FIG. 14 is a side view of the brush seal of the present invention, depicting in ghost lines several potential locations of the brushes.
Figure 15:
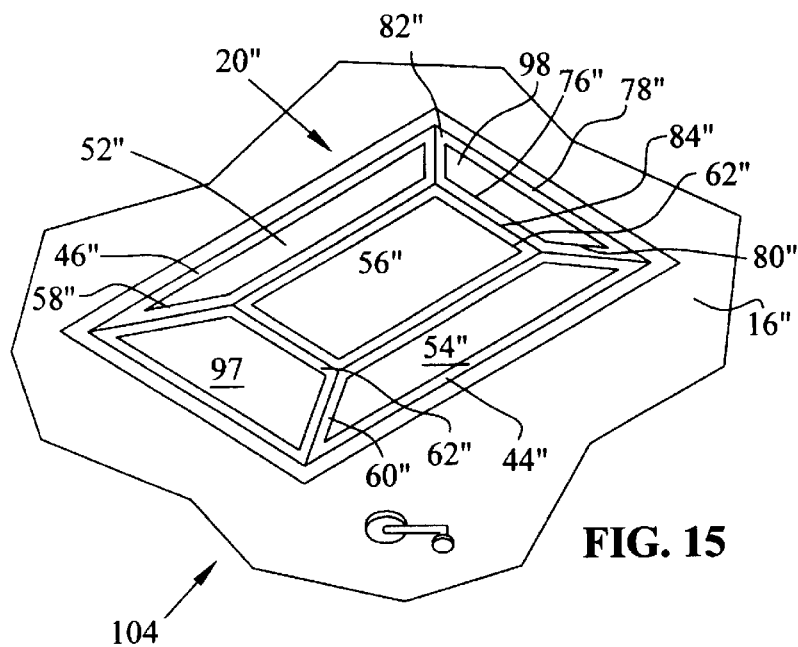
FIG. 15 is a fragmentary view in perspective and taken from outside a recreational vehicle equipped with a third embodiment of a foldable bay window pursuant to the teachings of the present invention, the bay window being illustrated in a deployed position in the ceiling of the vehicle.
Figure 16:
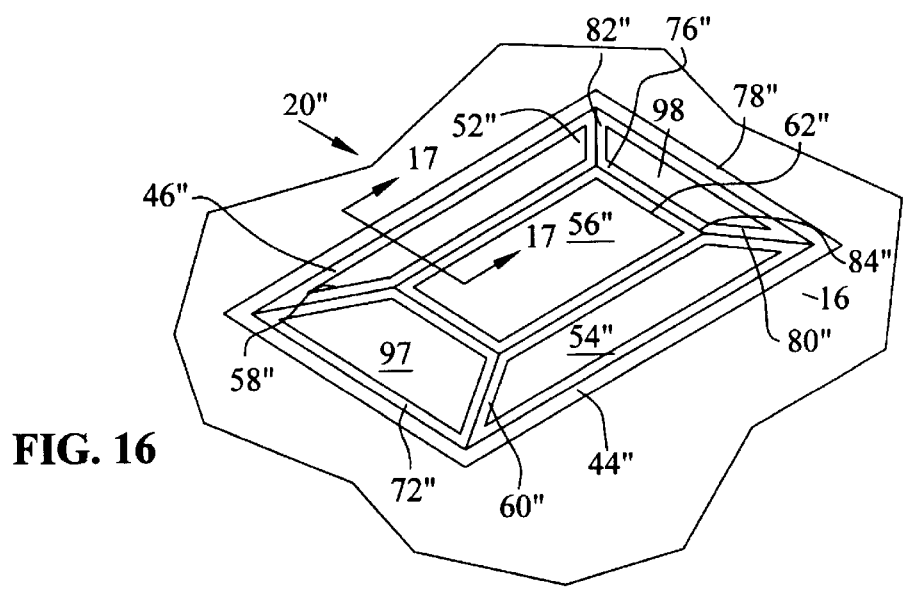
FIG. 16 is a view similar to FIG. 15, but taken from inside the recreational vehicle, illustrating the bay window in a deployed position in the ceiling of the vehicle.
Figure 17:
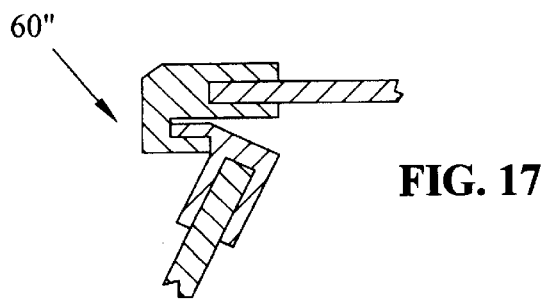
FIG. 17 is a cross-sectional view of the catch taken along line 17—17 of FIG. 16.
Figure 18:
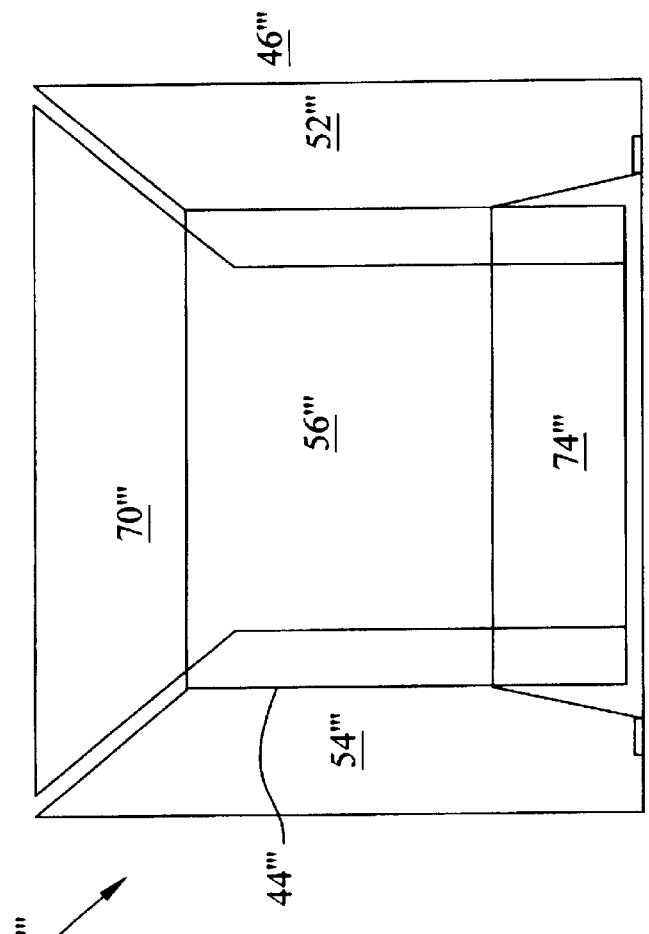
FIG. 18 is a fragmentary view in perspective and taken from inside a recreational vehicle equipped with a fourth embodiment of a foldable bay window pursuant to the teachings of the present invention, the bay window being illustrated in a position intermediate to the fully extended and folded positions.

When unit 10 is to be moved, straps 92 are released, and bottom panel 74 is forced upwardly along tracks 44, 46 as illustrated in FIG. 7. Again, since pins 88 and their engagement of tracks 44, 46 restrain the end of panel 74 resting on lower frame member 30 to movement in a vertical direction and pivoting about hinge 84, upward movement of the end of bottom panel 74 along with tracks 44, 46 urges the center pane inwardly toward sidewall 12, and also forces side panes 52, 54 to slide along tracks 40 and 42 and thereby pivot inwardly toward sidewall 12 as center pane 56 is moved as a result of bottom panel 74 moving upwardly as illustrated in FIG. 7. Accordingly, panes 52, 54, 56 are moved into the retracted position illustrated in FIGS. 5 and 8. When panes 54, 56 and 52 are folded into the positions against sidewall 12 as illustrated in FIGS. 5 and 8, bottom panel 74 is substantially vertical, and roof panel 72 drops into a substantially vertical orientation, also as illustrated in FIGS. 5 and 8. As shown in FIGS. 5 and 8, in the folded position bay window assembly 20 does not project appreciably beyond the outer surface of sidewall 12, thereby permitting unit 10 to be accommodated for movement along the public highways. When unit 10 is again parked for use, bottom panel 74 is moved downwardly back into the FIG. 6 position, thereby forcing panes 52, 54 and 56 outwardly, and pivoting roof panel 70 upwardly, back into the FIG. 6 position.

A second embodiment of the present invention is similar to the first embodiment except that inner edge 76' of bottom panel 74' is movably connected to outer frame 24' by hinge 84', rather than being connected to the lower edge of the frame of center pane 56'. This permits bottom panel 74' to pivot about a generally horizontal axis about sidewall 12', rather than pivoting about center pane 56'. Similar to the engagement between bottom panel 74 and tracks 44, 46 of the first embodiment, bottom panel 74' is slidably mounted on outer edge 78' adjacent tapering side edges 80' and 82' to tracks 44',46' of center pane 56' for sliding movement in a generally vertical direction. Similar to the first embodiment, pins covered with plastic bushing project downwardly from lower corners of frames 58' and 60', opposite the corner on which hinges 64' and 66' are mounted, and slidably and pivotally engage tracks 40' and 42' to permit panes 52' and 54' to slide horizontally while pivoting about hinges 64' and 66'.

Additionally, several features are added to this alternative embodiment of the present invention. A locking mechanism 79 is housed along the outer edge 78' of the bottom panel 74' and when engaged, keeps the bay window assembly 20' from inadvertently extending into its outwardly extending position. Locking mechanism 79 includes a pair of rods 83 and 85 which are slidable in diametrically opposed directions. When locking mechanism 79 is engaged, rods 83 and 85 traverse side panes 52' and 54', and when locking mechanism 79 is retracted, rods 83 and 85 lie along outer edge 78' of bottom panel 74', contiguous to one another.

Locking mechanism 79 is further comprised of a detent mechanism (not shown) for securing rods 83 and 85 in place, thus securing the extension bay window in either a locked or an unlocked position. The detent mechanism is comprised of a pair of springs (not shown), one spring associated with each side panel 52', 54' of extension bay window 20', and a pair of detent plates (not shown) located on each rod 83, 85. Each detent plate is comprised of a recess (not shown) for receiving the springs as rods 83 and 85 are slid into their traverse position. Locking mechanism 79 is only capable of engagement when the extension bay window 20' is folded and when bottom panel 74' is in a substantially vertical position. To engage locking mechanism 79, rods 83 and 85 are manually slid in diametrically opposed directions until the springs are received into the recess located in each detent plate. The detent mechanism ensures that rods 83 and 85 remain in their traverse position, thus guarding against the inadvertent extension of the bay window assembly 20'. When it is desirable for the bay window assembly 20' to be pushed into its extended position, it is necessary to retract locking mechanism 79. Rods 83 and 85 are manually slid toward one another, and when locking mechanism is fully retracted, rods 83 and 85 lie contiguous to one another along the outer edge 78' of bottom panel 74'.

Locking mechanism 79 also has a handle 87 disposed on one of rods 83 and 85 for manual actuation of the extension bay window 20'. When locking mechanism 79 is retracted, handle 87 is used to push the extension bay window 20' into its extended position, thus resulting in the substantially horizontal position of bottom panel 74'. Likewise, when the bay window 20' is pulled back into its folded position, handle 87 is pulled upward toward the user, resulting in bottom panel 74' sliding along center pane 56' until bottom panel 74' is in a substantially vertical position.

The channels (not shown) of tracks 40', 42' and the channels (not shown) of tracks 44', 46' have a notched shape, and panes 52', 54', and 56' slide between the sides of the channels of tracks 40', 42' and the channels of tracks 44', 46'. The application of polymer adhesive tape to panes 52', 54', and 56' creates a fluid connection between panes 52', 54', and 56' and the channels of tracks 40', 42' and the channels of tracks 44', 46', resulting in a seal which deters the penetration of moisture and air at the point of connection of panes 52', 54' and tracks 40', 42' and 44', 46'. After panes 52', 54', and 56' are slid into the channels of tracks 40', 42' and the channels of tracks 44', 46', an elastomer compression sealing material is used to further seal the connection between panes 52', 54', and 56' and the channels of tracks 40', 42' and tracks 44', 46'.

When the bay window 20' is pushed into its extended position, roof panel 70' pivots outwardly from wall 12', and is supported on the upper edges of frames 58', 60', and 62' with frames 58' and 60' tapering upwardly from its hinges 64' and 66'. Horizontal bars 71 and 73 are strips of metal extending across the length of roof panel 70', and are positioned so as to distribute the load of pushing over the entire surface of the roof panel. As side panels 34' and 36' push against the roof, the force of the pushing is distributed over horizontal bars 71 and 73, and roof panel 70' extends outwardly.

Longitudinal brush seals 95 are placed at all non-hinged junctions of bay window 20', and have sufficient brush hair density to deter the penetration of moisture and the elements into the bay window 20'. Brush seals 95 are manufactured of one of a wide variety of flexible plastic or elastomeric materials, and have a plurality of bristles randomly juxtaposed so as to provide maximum sealing capacity. Brush seals 95 are utilized between roof panel 70' and upper edges of frames 58', 60' and 62', and between bottom panel 74' and the lower edges of frames 58', 60' and 62'. Hinge seals 96 are mounted along all hinged junctions of the bay window 20', and have a flexible seal disposed within a concave longitudinal aperture for receiving and sealingly contacting a pivot member. Hinge seals 96 provide maximum sealing capacity along all hinged junctions of bay window 20', namely between side pane 52' and center pane 56', between side pane 54' and center pane 56', between roof panel 70' and sidewall 12', and between bottom panel 74' and sidewall 12'.

In a third embodiment of the present invention, bottom panel 74" and roof panel 70" are replaced by a first end panel 97 and a second end panel 98. This third embodiment may be located on the ceiling 16" of the recreational vehicle, thus providing a skylight.

First end panel 97 is movably connected to ceiling 16" via hinge connection 72" to permit pivoting of first end panel 97 from the extended position, in which first end panel projects outwardly from ceiling 16", to a folded position, in which first end panel 97 lies substantially flush with ceiling 16". In the extended position, first end panel 97 is supported on the upper edges of frames 58", 60", and 62", with frames 58" and 60" tapering upwardly from their hinges 64" and 66" that connect them with frame 62" of center frame 56" toward ceiling 16". Accordingly, when window 20" is folded, first end panel 97 rivots from the outwardly projecting position to a substantially flush position with ceiling 16".

Window assembly 20" further includes second end panel 98. Edge 76" is movably connected to the lower edge frame 62" by hinge 84," thereby permitting second end panel 98 to pivot about ceiling 16". Edges 80" and 82" terminate in non-tapering portions 86" from which pivot pins 88" project. Pivot pins 88" are slidably and pivotally received in corresponding ones of tracks 44" and 46". Pins 88" are offset from edge 78" a distance such that when second end panel 98 is disposed in the extended position in which second end panel 98 is substantially horizontal, edge 78" is substantially flush with the inner surface of ceiling 16". End panels 97 and 98 may be extended into their upwardly extending position by utilizing a crank 104 or a motor (not shown). As end panels 97 and 98 extend into their upwardly extending position, they push side panels 52", 54" and center panel 56" into an upwardly extending position as well.

Alternatively, first and second end panels 97, 98 may be connected to center panel 56" by a catch 106 disposed on center panel 56", rather than through the use of tracks.

Figure 19:
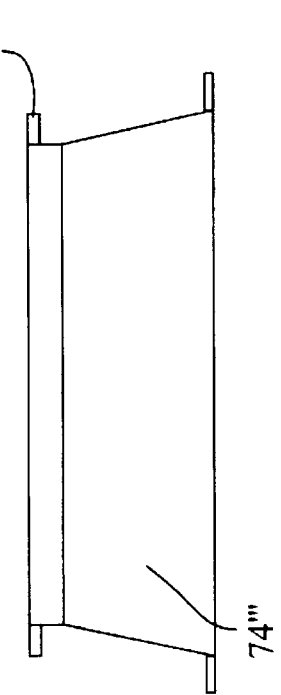
FIG. 19 is a plan view of the bottom panel of the fourth embodiment of the present invention.
Figure 20:
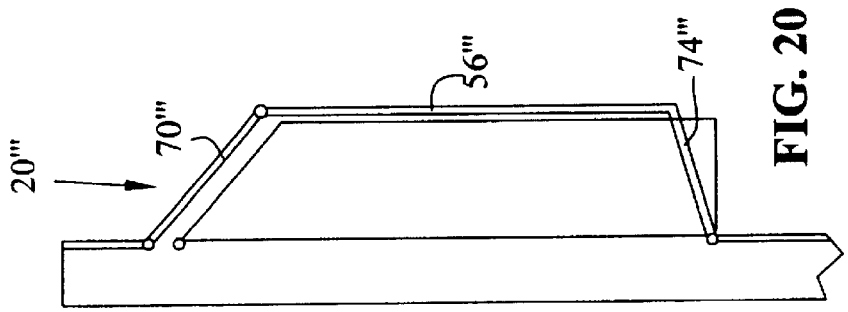
FIG. 20 is a side view taken from outside a recreational vehicle equipped with a fourth embodiment of a foldable bay window pursuant to the teachings of the present invention, the bay window being illustrated in a position intermediate to the fully extended and folded positions.

In a fourth embodiment, shown in FIGS. 19–20, which is similar to the third embodiment in that it may be located on the ceiling 16 of a recreational vehicle, thus providing a skylight, side panes 52''' and 54''' do not slide in tracks 40''' and 42''', and 44''' and 46'''. Rather, center pane 56''' is hinged to roof panel 70''', and side panes 52''' and 54''' are pushed in an outward direction in order to extend bay window 20''' into its deployed position.

In a fifth embodiment, shown in FIGS. 21–25, also similar to the third embodiment in that it may be located on the ceiling 16 of a recreational vehicle, thus providing a skylight, center pane 56"" floats on side panes 52"" and 54"" rather than being hinged to side panes 52"" and 54"". Additionally, bottom panel 74"" does not slide. Rather, bottom panel 74"" is hinged to side panes 52"" and 54"". When bay window 20"" is extended into its outwardly extending position, side panes 52"" and 54"" travel up tracks 44"" and 46"". FIG. 25 depicts the connection of pin 88"" with track 108 of the pivot member of hinge seal 96"".

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An extendable bay window unit for mounting in an opening of a wall of a living quarters structure, the bay window unit comprising:
    a frame mountable in the opening of the wall and having a first side panel and a second side panel; and
    a bay window assembly mountable on said frame and movable between a first extended position and a second folded position, said bay window assembly comprising:
    a center pane having a first side and an opposite second side;
    a first side pane pivotally attached at one edge to said first side of said center pane and slidably attached at an opposite edge to said first side panel;
    a second side pane pivotally attached at one edge to said second side of said center pane and slidably attached at an opposite edge to said second side panel; and
    a bottom panel movable between a horizontal position and a vertical position, said bottom panel operably engaged at an inner edge to said frame and operably engaged at an opposite outer edge to drive said center pane such that when said bottom panel is moved between said horizontal position and said vertical position said bottom panel drives said bay window assembly to move between said first extended position and said second folded position, respectively.

2. The extendable bay window unit of claim 1 wherein said bottom panel is pivotally attached at said inner edge to said frame.

3. The extendable bay window unit of claim 2 wherein said center pane includes a pair of vertical tracks mounted on said center pane, and said outer edge of said bottom panel slidably engages said pair of tracks.

4. The extendable bay window unit of claim 1 wherein each of said first and second side panels includes a horizontally extending track, and each of said first and second side panes includes a pin which slidably and pivotally engages a corresponding one of said horizontally extending tracks of said first and second side panels, respectively.

5. The extendable bay window unit of claim 1 wherein said bay window assembly includes a roof panel pivotally attached at an inner side to said frame and pivotable between a first substantially horizontal position wherein said roof panel is supported by said center pane, said first pane and said second pane, and a second substantially vertical position.

6. The extendable bay window unit of claim 5 wherein said roof panel includes a pair of bars extending perpendicularly from said inner side of said roof panel.

7. The extendable bay window unit of claim 5 wherein said first side pane, said center pane, and said second side pane each have an upper edge, each said upper edge including a brush seal, and each said upper edge structured and arranged to maintain contact of said respective brush seal with said roof panel in said first extended position and while said bay window assembly moves to said second folded position.

8. The extendable bay window unit of claim 1 further comprising means for locking said bay window assembly in said second folded position.

9. The extendable bay window unit of claim 8 wherein said locking means includes a pair of rods mounted on said outer edge of said bottom panel, each of said rods slidably extendable from a retracted unlocked position to an extended locked position pair of rods when in said locked position extend from said bottom panel and attach to said first and second side panels to lock said bay window assembly in said second folded position.

10. The extendable bay window unit of claim 9 wherein said pair of rods when in said unlocked position are retracted within said locking mechanism such that said pair of rods are contiguous to one another.

11. An extendable bay window unit for mounting in an opening of a wall of a living quarters structure, the bay window unit comprising:
 a frame mountable in the opening of the wall;
 a bay window assembly mountable on said frame and movable between a first extended position and a second folded position, said bay window assembly comprising:
  a center pane having a first side and an opposite second side;
  a first side pane pivotally attached at one edge to said first side of said center pane and slidably attached at an opposite edge to said frame;
  a second side pane pivotally attached at one edge to said second side of said center pane and slidably attached at an opposite edge to said frame; and
  a bottom panel attached at an inner edge to said frame and engaged at an opposite outer edge to said center pane; and
 a locking mechanism mounted on said bottom panel adapted to lock said bay window assembly in said folded position.

12. The extendable bay window unit of claim 11 wherein said locking mechanism includes a pair of rods, each of said rods slidably extendable from a retracted unlocked position wherein said pair of rods are retracted within said locking mechanism to an extended locked position wherein said pair of rods extend from said bottom panel and attach to said frame, said pair of rods being contiguous to one another when in said unlocked position.

13. The extendable bay window unit of claim 11 wherein said center pane includes a pair of vertical tracks mounted on said first and second sides of said center pane, said outer edge of said bottom panel slidably engaged to said pair of tracks.

14. The extendable bay window unit of claim 13 wherein said bottom panel is pivotally attached at said inner edge to said frame, said bottom panel movable between a horizontal position and a vertical position such that when said bottom panel is moved between said horizontal position and said vertical position said bottom panel operates to move said bay window assembly between said first extended position and said second folded position, respectively.

15. The extendable bay window unit of claim 14 wherein said locking mechanism further includes a handle for moving said bottom panel from said horizontal position to said vertical position, and for thereby moving said bay window assembly between said first extended position and said second folded position.

16. The extendable bay window unit of claim 15 wherein said frame includes first and second side panels, each of said first and second side panels include a horizontally extending track, each of said first and second side panes including a pin extending from said first and second side panes and slidably and pivotally engaging said horizontally extending track of each of said first and second side panels, respectively.

17. The extendable bay window unit of claim 11 wherein said bay window assembly includes a roof panel pivotally attached at an inner side to said frame and pivotable between a first substantially horizontal position wherein said roof panel is supported by said center pane, said first pane and said second pane, and a second substantially vertical position.

18. The extendable bay window unit of claim 17 wherein said roof panel includes a pair of bars extending perpendicularly from said inner side of said roof panel.

19. An extendable bay window unit for mounting in an opening of a wall of a living quarters structure, the bay window unit comprising:
 a frame mountable in the opening of the wall and having a first side panel and a second side panel; and
 a bay window assembly mountable on said frame and movable between a first extended position and a second folded position, said bay window assembly comprising:
  a center pane having a first side and an opposite second side, said center pane having a pair of vertical tracks mounted to said first and second sides of said center pane, said center pane having an upper edge with a brush seal;
  a first side pane pivotally attached at one edge to said first side of said center pane and attached at an opposite edge to said first side panel, said first side pane having an upper edge with a brush seal;
  a second side pane pivotally attached at one edge to said second side of said center pane and attached at an opposite edge to said second side panel, said second side pane having an upper edge with a brush seal;
  a bottom panel attached at an inner edge to said frame and engaged at an opposite outer edge to said center pane, said bottom panel drivingly associated with said center pane to move said bay window assembly between said first extended position and said second folded position; and
  a roof panel associated with said bay window assembly such that said upper edges of said center pane, said first side pane, and said second side pane maintain a sealing contact with said roof panel in said first extended position and while said bay window assembly moves between said first extended position and said second folded position.

20. The extendable bay window unit of claim 19 wherein said bottom panel is pivotally attached at said inner edge to said frame.

21. The extendable bay window unit of claim 19 wherein said center pane includes a pair of vertical tracks mounted on said center pane, and said outer edge of said bottom panel slidably engages said pair of tracks.

22. The extendable bay window unit of claim 19 wherein each of said first and second side panels includes a horizontally extending track, and each of said first and second side panes includes a pin which slidably and pivotally engages a corresponding one of said horizontally extending tracks of said first and second side panels, respectively.

23. The extendable bay window unit of claim 19 wherein said roof panel includes a pair of bars extending perpendicularly from said inner side of said roof panel.

24. The extendable bay window unit of claim 19 further comprising means for locking said bay window assembly in said second folded position.

25. The extendable bay window unit of claim 24 wherein said locking means includes a pair of rods mounted on said outer edge of said bottom panel, each of said rods slidably extendable from a retracted unlocked position to an extended locked position pair of rods when in said locked position extend from said bottom panel and attach to said first and second side panels to lock said bay window assembly in said second folded position.

* * * * *

UNITED STATES PATENT AND TRADEMARK OFFICE
CERTIFICATE OF CORRECTION

PATENT NO. : 6,560,937 B1
DATED : May 13, 2003
INVENTOR(S) : Gardner et al.

It is certified that error appears in the above-identified patent and that said Letters Patent is hereby corrected as shown below:

<u>Title page,</u>
Item [75], Inventors, please delete the middle initial of "B" for "Dennis Vance" and insert the middle initial "R"

Signed and Sealed this

Twenty-third Day of September, 2003

JAMES E. ROGAN
*Director of the United States Patent and Trademark Office*